Patented Feb. 6, 1934

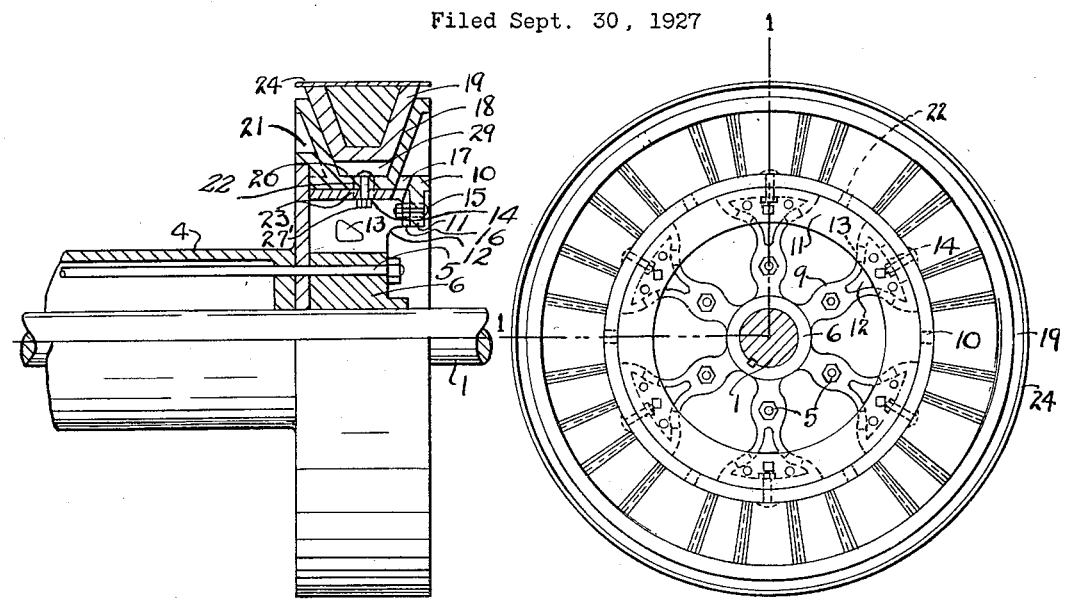
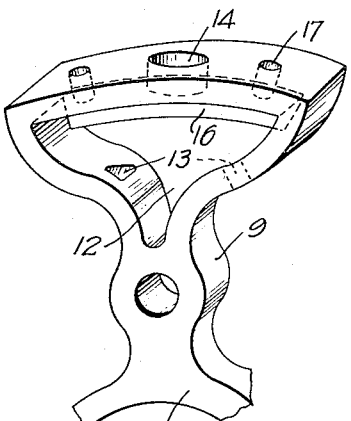
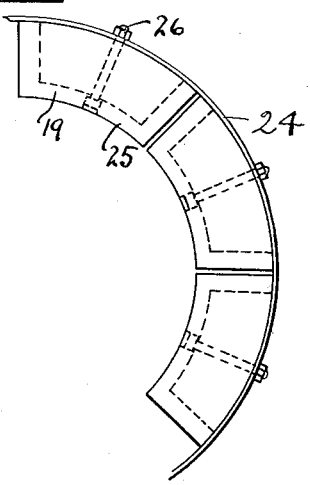
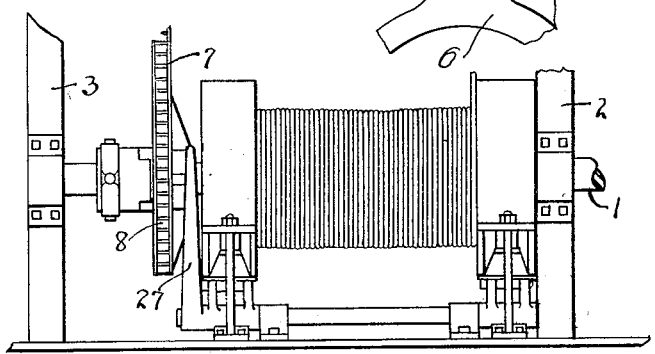

1,946,269

UNITED STATES PATENT OFFICE 1,946,269

BRAKE DRUM FOR HOISTING REELS

Burwell Boykin, Jr., Beaumont, Tex.

Application September 30, 1927
Serial No. 222,970

4 Claims. (Cl. 188—77)

My invention relates to brake drums such as are employed on hoisting reels particularly in oil field work but is capable of general application.

It is an object of the invention to provide a hoisting reel for rapid operation and having a brake drum constructed to prevent overheating in use, and which is also strong and not liable to break in use.

It is also an object to provide a rim for the brake drum which will be easily cooled but which will also provide a large friction surface for control of the reel in unreeling operations.

It is desired that the brake drum be kept cool by the circulation of air about the same in operation, and to make the rim of the drum detachable for replacement whenever the same becomes impaired in use.

Referring to the drawing herewith, Fig. 1 is a broken front view of a brake drum employing the invention, part being in elevation and part in central vertical section. Fig. 2 is a side elevation of the drum. Fig. 3 is a front elevation of a hoisting reel such as is equipped with the invention. Fig. 4 is a broken side elevation of the brake band. Fig. 5 is a broken detail of one of the spokes.

I have shown my invention as constructed with a brake drum separate from the spool or reel upon which the drum is employed. There is a shaft 1 upon which the drum is mounted supported in uprights 2 and 3 and upon this shaft is the reel for hoisting, said reel having a central spool 4 mounted upon the shaft with brake drums at each end of the reel. The two drums are held rigidly in contact with the reel through means of through bolts 5 extending through the hubs 6 of the drums and longitudinally through the reel, the nuts upon said bolts acting to clamp the assembly rigidly together for rotation with the shaft. The said shaft may be rotated by means of a sprocket chain 7, through which power may be transmitted from a power shaft, not shown, to the sprocket wheel 8 on the shaft 1, as shown in Fig. 3.

The brake drum comprises a central spider having a hub 6, as previously mentioned, and spokes 9 radiating from the hub 6 for connection at their outer ends with the inner portion 10 of the rim. The spokes 9 are preferably made an integral part of the hub. Their outer ends are extended laterally and the outer end is made arcuate to fit the inner surface of the rim 10. The inner portion of the end of the spoke is hollow and there is a flange 11 upon the rim which extends inwardly on the outer side of the rim partially closing the lateral opening through the end of the spoke. An air inlet 12 is provided in the spoke not covered by the flange 11 of the rim. The sides of the spoke within the rim have openings 13 on each side of the spoke to admit air for circulation and a radial opening 14 is provided in the spoke to allow the passage of air outwardly against the rim.

The rim of the brake drum comprises a ring of metal of the full width of the spoke and having the flange 11 thereon secured to the spokes through means of bolts 15, said bolts extending through the flange 11 and into the flange 16 on the outer side of the spoke. Openings are shown at 17 extending through the lower portion of the rim and through the outer end of the spoke so as to allow circulation of air into the interior of the drum.

The outer surface of the rim has a deep peripheral groove 18 therein which is adapted to receive the brake band 19. This groove has its side walls inclined inwardly and downwardly to a point closely adjacent the end of the spoke, the bottom or inner wall 20 of the groove being flattened transversely, as shown in Fig. 1. On the side of the rim adjacent the reel there are recesses 21 between the spokes of the wheel into which air may enter during the rotation of the reel for cooling purposes, and there are spaced openings 22 in the lower wall 23 of the groove, said openings being formed between the spokes to allow air to fill the lower end of said groove.

The brake band comprises an outer plate or band 24 having secured thereto a series of arcuate blocks 19, as shown in Fig. 4. These blocks are of light material and have on their inner faces a layer 25 of asbestos or similar heat resisting material which is adapted to engage with the walls 18 of the brake drum and make a frictional contact therewith for braking purposes. The blocks 19 taper inwardly, as shown in the drawing, and are secured to the brake band 24 by means of bolts 26 or other similar means. They are spaced apart slightly so as to allow a contraction of the brake band about the drum when the said brake band is tightened against the drum through means of the lever 27, shown in Fig. 3.

The rim is secured to the spokes through means of the bolts 15 and bolts 27' are also extended radially through the end of the spoke and the inner wall 22 of the rim, and it will thus be noted that the brake rim may be removed from the spokes by the withdrawing of the attaching bolts. If, therefore, the brake drum should crack at the rim through hard usage, the rim of the drum could be removed and replaced without the necessity of replacing the supporting spider upon which the rim is mounted.

Another feature of value lies in the manner in which the brake band is fitted against the rim. The said brake band engages with a comparatively large area of contact, as along the sloping sides 18 of the rim. The blocks 19 upon the brake band do not extend entirely to the bottom of the groove 18 and there is, therefore, a space 29 between the brake band and the bottom of the groove through which air can circulate in the manner stated. The sides and bottom of the groove are, therefore, open for cooling purposes in the best possible manner. The engagement between the brake band and brake drum is, therefore, such as to provide a large area of contact and a wedging action of the band against the rim which produces an efficient frictional engagement.

The brake drum thus constructed will be easily assembled or disassembled. It is constructed for efficient cooling through the circulation of air and it has an effective braking action between the brake band and the drum.

Having thus described my invention, what I claim as new is:

1. In combination, a brake drum rim having its peripheral surface inclined inwardly to form a deep groove, and a brake band having segments thereon adapted to fit within said groove, said rim being constructed with openings through the bottom of said groove to allow a circulation of air between said segments and said rim.

2. In a brake drum a hub, a rim, spokes on said hub supporting said rim, said spokes being detachably connected with said rim, and hollow ends on said spokes adjacent said rim, said ends having radially extending openings to allow circulation of air therethrough to said rim and a brake band engaging said rim.

3. In a brake drum a hub, a rim, spokes on said hub supporting said rim, said spokes being detachably connected with said rim, and hollow ends on said spokes adjacent said rim, said ends having openings to allow circulation of air therethrough to said rim, and a brake band on said rim having a wedging fit therewith in the manner described.

4. In a hoisting device, a reel, a brake drum thereon, a rim on said drum having its frictional surface inclined inwardly, from both sides to form a wide peripheral groove, and a brake band shaped to fit against the said inclined surface and adapted to be wedged therein when tightened thereon, in which said brake band comes short of the bottom of said groove to leave an air circulating space, and means to admit air to said space including passages thru the base of said groove.

BURWELL BOYKIN, Jr.